United States Patent [19]

Wiley

[11] Patent Number: 4,706,386
[45] Date of Patent: Nov. 17, 1987

[54] QUICK CHANGE MECHANISM FOR DIAMOND ARBOR CIRCULAR SAW BLADES AND OTHER SPINNING DISC DEVICES

[76] Inventor: Edward R. Wiley, 9020 SE. 51st Pl., Mercer Island, Wash. 98040

[21] Appl. No.: 902,415

[22] Filed: Aug. 28, 1986

[51] Int. Cl.$^4$ ............................................. B27B 5/32
[52] U.S. Cl. ...................................... 30/388; 83/666; 403/247; 403/256
[58] Field of Search ............... 403/201, 256, 247, 315; 30/388, 391; 83/666

[56] References Cited

U.S. PATENT DOCUMENTS 3,869,795 3/1975 Treace .................................. 30/388
4,205,572 6/1980 Weiner .................................. 30/388

FOREIGN PATENT DOCUMENTS 648398 7/1979 U.S.S.R. ................................. 83/666

Primary Examiner—Z. R. Bilinsky
Attorney, Agent, or Firm—Roy E. Mattern, Jr.

[57] ABSTRACT

An embodiment of a quick change mechanism permits, without using hand tools, the very quick changing, in second, of circular saw blades and other spinning disc devices, which have diamond shaped arbor holes, in respect to the drive shafts of portable powered circular blade saws, and radial saws. No modification of most existing saws is required. At the location of the existing saw drive shaft, with its central threaded hole, the drive shaft bearing, and the saw body; this quick change mechanism is secured, using an installation bolt passing through it and into the central threaded hole of the existing saw drive shaft.

6 Claims, 7 Drawing Figures

QUICK CHANGE MECHANISM FOR DIAMOND ARBOR CIRCULAR SAW BLADES AND OTHER SPINNING DISC DEVICES

CROSS REFERENCE

Other embodiments of the quick change mechanism for circular saw blades and other spinning disc devices are set forth in my copending application Ser. No. 06/774,331, filed Sept. 10, 1985, and information therein is hereby incorporated into this application, as may be necessary.

BACKGROUND OF INVENTION

This invention relates to mechanism for attachment and removal of circular saw blades on both motor driven hand held saws and stationary table saws. Also such mechanism handles other disc tool heads such as grinder wheels, sander discs and buffers.

Blade changes on power circular saws now on the market generally require the use of two tools, one tool to hold the blade, the other tool to unscrew the nut or bolt which holds the blade on the shaft of the saw. One brand of hand saw has a mechanism for locking the drive gears which eliminates the tool for holding the blade. However, they all have at least two or three nuts, bolts and washers which are removed from the shaft in a blade change operation. This is particularly inconvenient in a cluttered workplace, where special tools provided by the saw manufacturer and/or removable parts are often lost. Today, at least ten special purpose saw blades are sold for use in cutting different materials and for different cutting results in the same material. To obtain best results the appropriate cutting blade should be used. When blade changes are difficult, time consuming, or when special tools are misplaced, blade changes are postponed or not done at all. Therefore there is a need for having a mechanism which is used to more quickly attach and remove circular saw blades, etc. and which is retrofitted to existing hand held power saws and table saws.

In reference to circular saw blades having arbors with circular holes, I have presented my quick change mechanism embodiments in my copending application Ser. No. 06/774,331. Now I am presenting this quick change mechanism embodiment for installing saw blades having arbors with diamond holes.

SUMMARY OF THE INVENTION

Currently almost all circular saw blades for hand held circular saws or table saws are manufactured with a round arbor hole set into a diamond shaped "knockout" plug, which allows the blade to be used either for heavy duty diamond arbor saws or standard circular arbor saws. All saws now on the market use nut/bolt-/washer type attachment mechanisms, which require that special tools be used to remove and replace the circular saw blades. Tools are often lost or misplaced and needed blade changes are simply not made. This results in using dull blades or blades not designed for a specific application. Consequently production work is slowed down and/or undertaken via sloppy cutting operations, creating poor products at higher costs.

Therefore this invention, as set forth in the disclosed embodiment, is a quick change mechanism for installing and removing diamond arbor circular saw blades and other spinning disc devices, with respect to saws, within a few seconds, without using any tools. Essentially no changes are made to the saws or the circular saw blades now being manufactured. There are exceptions, however, for the blade guard must be raised on some hand held power saws about fifty thousandths of an inch. This is undertaken by inserting a washer of this thickness between the blade guard and the bearing surface, the blade guard formerly contacted. Then to compensate, fifty thousandths of an inch is taken off of the outer side of the blade guard hub.

The quick change mechanism, which may also be referred to as a press and lock circular saw blade holder for diamond arbor circular saw blades, as assembled, is held in place on the end portion of the drive shaft of a particular saw by using an installation bolt. This bolt is tailored to a specific saw model, because all saw models do not all have identical internal threads nor outside diameter shaft sizes. For example, worm drive saws have five eighths of an inch shafts with three eighths of an inch internal left hand threads, to insure the installation bolt will stay tight or tighten, when the circular saw is rotating, when the power is turned on. Other saws have one half inch diameter shafts with left or right hand internal threads.

This quick change mechanism secured by the selected tailored installation bolt to the respective saw drive shaft is an axially arranged assembly of:

a base fitted over the saw drive shaft and positioned adjacent to the saw body and formed with a cross recess to position an ejector spring;

an ejector spring having four spaced legs terminating in respective upturned lips, which is sized to fit into the cross recess of the base, and around the saw drive shaft;

a square body block to fit over the drive shaft and be positioned adjacent the ejector spring and having at its corners respective saw blade positioning lugs to fit the corners of the diamond shaped arbor of the circular saw blade;

a lock spring to fit over the saw drive shaft and to be positioned down against and also over the body block to contact the ejector spring legs and lips. It is arranged as a top with four side depending lock spring leafs, each one having a leaf ridge and a leaf lip;

a retaining cap to fit over the top of the saw drive shaft and to be positioned adjacent the top of the lock spring, and presenting a surrounding top edge camming surface, and having a central hole adapted to receive an installation bolt; and two assembly bolts passing respectively through two spaced aligned holes in each retaining cap, lock spring, body block, and thereafter turned tightly into threaded aligned holes of the base, thereby completing the assembly of this embodiment of the quick change mechanism.

After this quick change mechanism is so assembled and installed on a saw drive shaft, using an installation bolt, then a circular saw blade, having a diamond arbor, is pushed axially past the top edge camming surface of the retaining cap, and aligned with the blade positioning lugs. Then upon the continuing axial pushing of the circular saw blade having the diamond arbor, the saw blade deflects the lock spring leafs inwardly and also deflects the ejector spring lips. Then the circular saw blade eventually contacts the ejector spring legs and the base. At this installation time and installation position, the lock spring leafs are cleared sufficiently, so they radially expand to grip the saw blade. These lock spring leafs hold the circular saw blade between them and the combined ejector spring and base.

In this press lock procedure, the circular saw blade with a diamond arbor is quickly installed by its axial movement. It so remains safely installed, until the lock spring leafs are intentionally, radially, inwardly, deflected to clear the circular saw blade. Upon such clearance, the ejector spring becomes effective in removing the saw from the quick change mechanism, which remains as an assembly secured to the saw drive shaft.

DRAWINGS

A preferred embodiment of the quick change mechanism for diamond arbor circular saw blades and other spinning disc devices is illustrated in the drawings, wherein:

FIGS. 1 and 2 represent one of the most common previous prior art ways of securing a circular saw blade on a drive shaft of a hand held circular saw, with FIG. 1 as a partial exploded view, indicating the assembling procedure, and with FIG. 2 as a side view, further indicating this assembly procedure requiring the utilization of threaded fastener assemblies and hand tools;

FIG. 3 in a partial exploded view, illustrates how just this quick change mechanism is needed during the installation and removal of a circular saw blade.

Figure 6:
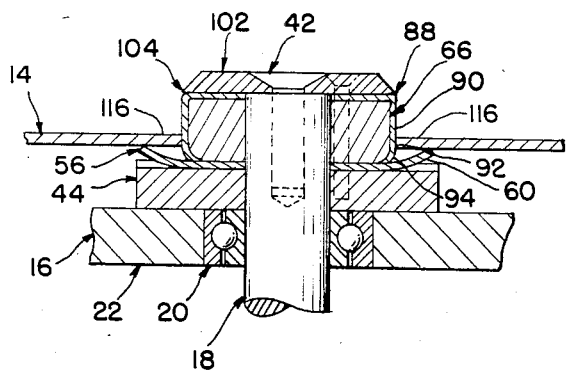
Figure 7:
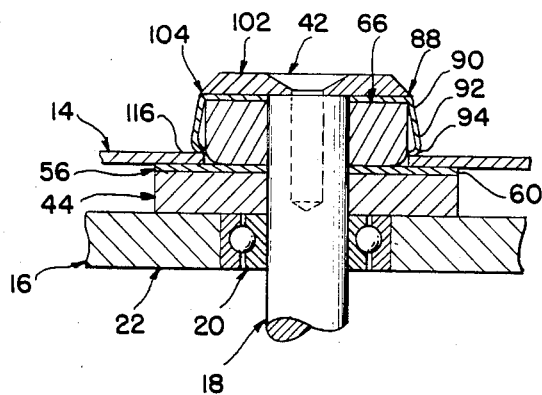

FIG. 6 is a side view, with most parts shown in section, showing the circular saw blade lowered over and past the retaining cap of this quick change mechanism, to then inwardly deflect the lock spring leafs, and to initially contact the ejector spring lips, and also an installation bolt and one of the unit assembly bolts are shown, with the arbor saw or drive shaft, the bearing, and portions of the surrounding power saw structure;

FIG. 7 is a side view, similar to FIG. 6, with most parts shown in section, showing, however, how the circular saw blade, with its diamond arbor opening, has been lowered further down into its locked and ready to cut position, wherein this circular saw blade has then depressed the ejector spring lips, and also passed sufficiently past the lock spring leafs, clearing them, so the leaf ridges and leaf lips have radially expanded outwardly over the circular saw blade, to hold this blade tightly between themselves and the ejector spring lips, i.e. so the circular saw blade is held tightly between the lock spring and the ejector spring in the base, while being radially positioned about the body block, when these portions and the balance of components of this quick change mechanism are firmly held in place by the retaining cap, unit assembly bolts, and the installation bolt which is threaded into the arbor shaft or drive shaft of the power saw, and after sawing, then to release the circular saw blade, the lock spring leafs are moved inwardly, by one's fingers, to clear the circular saw blade, and thereafter the ejector spring lips move the circular saw blade upwardly for its ongoing removal.

DESCRIPTION OF THE PREFERRED EMBODIMENTS

Figure 1:
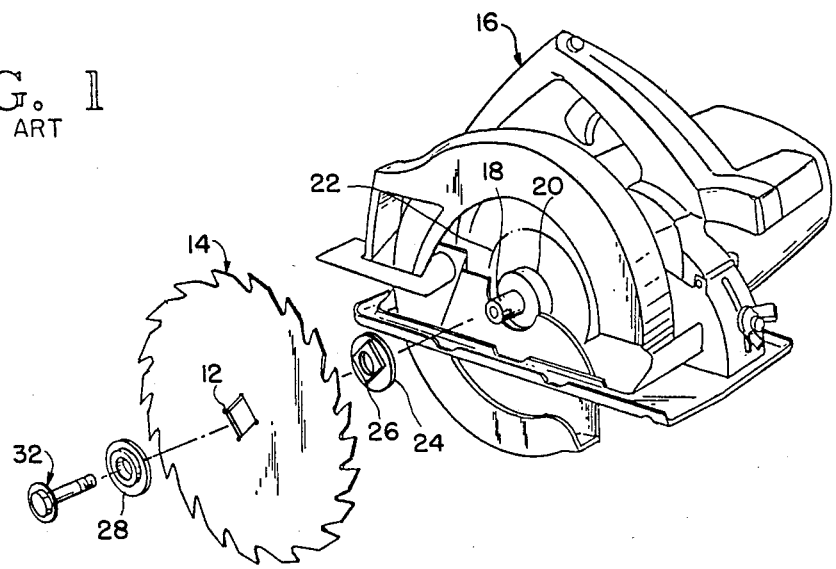
Figure 2:
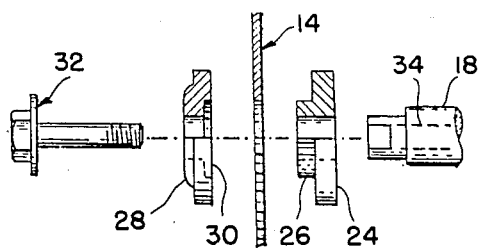
Figure 3:
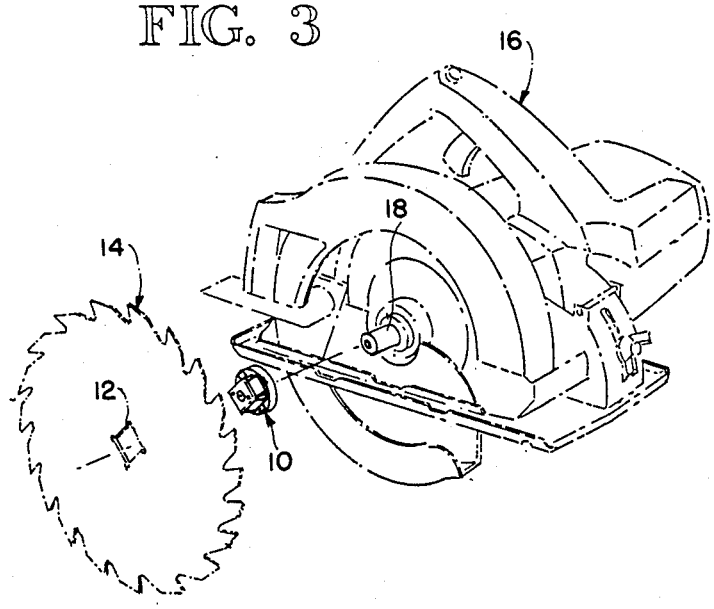

The preferred embodiment of this quick change mechanism 10 for changing diamond arbor 12 circular saw blades 14 and other spinning disc devices driven by power tools, such as hand held power saws 16, is illustrated in FIGS. 3 through 7. To better understand how quickly such saw blade changes are undertaken, the current method, i.e. the prior art method and apparatus, is shown in FIGS. 1 and 2. The hand held power saw 16 has a drive shaft 18, also referred to as the arbor shaft 18, extending out from shaft bearing 20, which is supported in the adjacent structure 22. On this shaft 18, a washer 24 having a diamond shaped plug projection 26 is first positioned. Then the circular saw blade 14 is endwise inserted to have its diamond arbor hole 12 fitted over the diamond shaped plug projection 26. Subsequently another washer 28 is endwise inserted, and its diamond shaped central recess 30 receives a portion of the diamond shaped plug projection 26 of the first inserted washer 24. Thereafter, an installation bolt 32 is inserted through the washer 28, diamond arbor hole 12 of the circular saw blade 14, the washer 24, and then threaded into the receiving threaded hole 34 of the drive or arbor shaft 18.

There is limited shaft end space, before reaching the surrounding guide portions 36 of this hand held power saw 16, in which to position these washers 24, 28, circular saw blade 14, and installation bolt 32. Moreover, some saws do not have drive shaft locks, so when circular saw blades are being installed, and the installation bolt 32 is subsequently tightened, at least two hand tools, not shown, are needed. One hand tool, when positioned, keeps the circular saw blade 14 and/or arbor shaft 18 from turning, and the other hand tool is used to turn and to tighten the installation bolt 32.

Many users of power saws 16 consider the removal of a circular saw blade 14 to sharpen it, or to replace it with another circular saw blade 14 of like purpose, or for a different purpose, or to replace a circular saw blade with a disc used for another purpose, as a time consuming operation. As a consequence, circular saw blades 14, not sharp enough for efficient and good cutting, are run longer than they should be. The wrong circular saw blades 14 are often used.

Therefore the quick change mechanism 10, illustrated in FIGS. 4 through 7, is provided to a craftsperson, so he or she may install this mechanism 20 conveniently on the drive or arbor shaft 18 of his or her power saw 16 of many types, and thereafter be able to quickly install and quickly remove circular saw blades 14 and discs, using only his or her hands and fingers. Yet when the power saw 16 is operating, the circular saw blade is securely and safely held in its rotating operational position.

Figure 4:
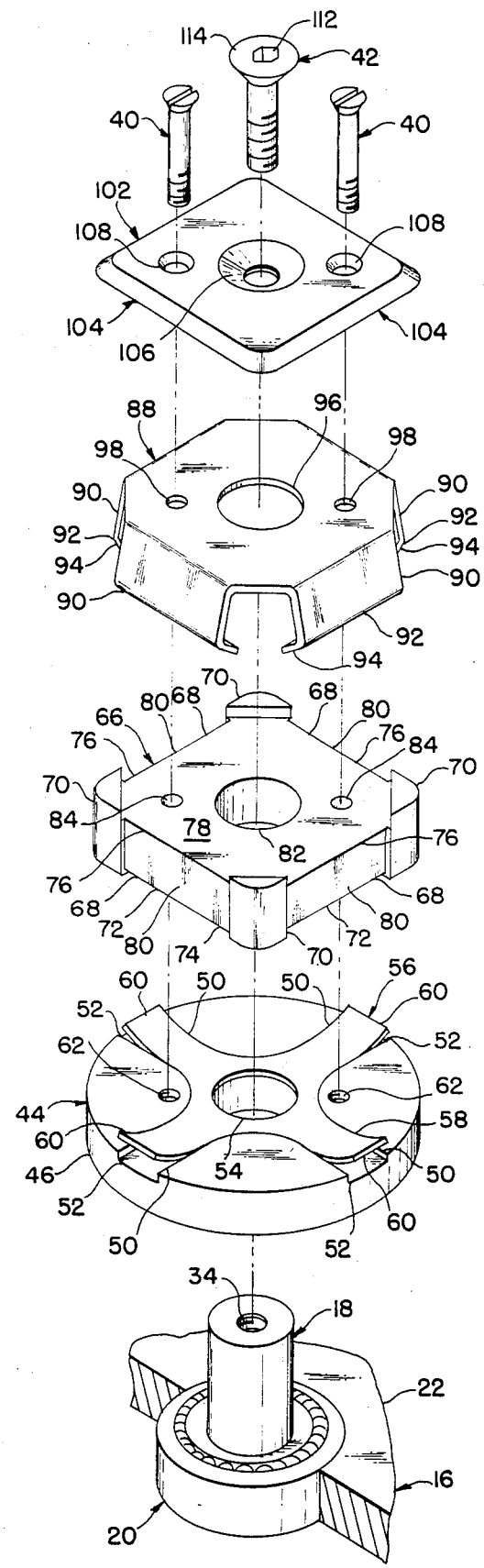
FIG. 4 is an exploded view of all of the components of this quick change mechanism for diamond arbor circular saw blades, and also included is the arbor shaft or drive saw shaft, the drive shaft bearing, and a portion of the power saw structure which supports the bearing and drive shaft, the latter being illustrated to indicate where and how this quick change mechanism is mounted on a power saw.

In the exploded view of FIG. 4, the respective endwise assembly of all of the components of this quick change mechanism 10 is illustrated. Also shown are the drive or arbor shaft 18, shaft bearing 20, and structure 22 of a power saw, such as the hand held power saw 16. This quick change mechanism 10 is equally useful on table and radial power saws.

The components of this quick change mechanism 10 are assembled and held together by two unit assembly bolts 40, and then, as so assembled, are secured to the drive or arbor shaft 18, using an installation bolt 42, which is generally especially sized in length to meet the axially required space occupied by this quick change mechanism 10, and the thread length of the threaded hole 34 of the arbor shaft 18. This installation bolt 42 matches the thread size and left or right turning direction of the threads of the original installation bolt 32.

In reference to FIG. 4, the preassembly of the quick change mechanism, a cylindrical base 44, has a planar bottom 46, a smooth circumferential side 48, except where ejector spring grooves 50, complete their radial extension at ends 52, after commencing at a central hole 54, which accommodates the arbor shaft 18. Into these ejector spring grooves 50, preferably four in number, an ejector spring 56 is complementary fitted. Each of the four legs 58 of the ejector spring 56 terminate in upturned ejector spring lips 60. Two threaded holes 62 are provided to receive and to secure the two unit assembly bolts 10.

The next component, in this axial assembly of the quick change mechanism 10, is a body block 66 having a diamond shaped outside surrounding suface 68, interrupted at each of the four corners, by integral circular saw blade positioning protruding lugs 70, which are also slightly longer in the axial direction than the axial depth or thickness of the body block 66. This difference in these lengths and/or thicknesses, provides receiving spaces 72 on the bottom 74 of the body block 66 to accommodate the upturned ejector spring lips 60, when axial assembly is undertaken, and also provides receiving spaces 76 on the top 78 of the body block 66 to accommodate the lock spring 88. Moreover, there are receiving spaces 80 adjacent the diamond shaped outside surrounding surface 68 between the blade positioning protruding lugs 70, to receive depending lock, spring leafs 90 and their respective lock spring 92 ridges and lock spring lips 94. Then in addition a central hole 82 is made to receive the arbor shaft 18, and two alike holes 84 are made to receive the two unit assembly bolts 10.

The lock spring 88, with its four depending lock spring leafs 90, which extend outwardly on a slant, until slanted back inwardly at their lock spring leaf ridges 92, which terminate in lock spring leaf lips 94, is fitted down axially over the body block 66, utilizing the respective receiving spaces 76 and 80. Also a central hole 96 is made to accommodate the arbor shaft 18, and two holes 98 are made to accommodate the two unit assembly bolts 40.

Then a diamond shaped retaining cap 102, having: a surrounding camming surface 104, to receive and to guide the diamond arbor hole 12 of a circular saw blade 14; a central countersunk hole 106 to receive the installation bolt 42; and two countersunk holes 108 to receive the two unit assembly bolts 40, is lowered into place over the lock spring 88.

When these parts, i.e. the base 44, ejector spring 56, body block 66, lock spring 88, and retaining cap 102 are aligned axially, they are secured together by the unit assembly bolts 40, as these bolts 40 are tightened into the threaded holes 62 of the base 44, to thereby complete the assembly of the quick change mechanism 10. This assembly is essentially just undertaken one time.

When this assembly of the quick change mechanism 10 has been completed, then this assembled mechanism 10 is inserted over the drive or arbor shaft 18 of the power saw 16, until the retaining cap 102 contacts the end of the arbor shaft 18. Preferably the tightening of the installation bolt 42 is undertaken by using an Allen wrench fitted to a hexagonal receiving hole 112 in the bolt head 114.

Figure 5:
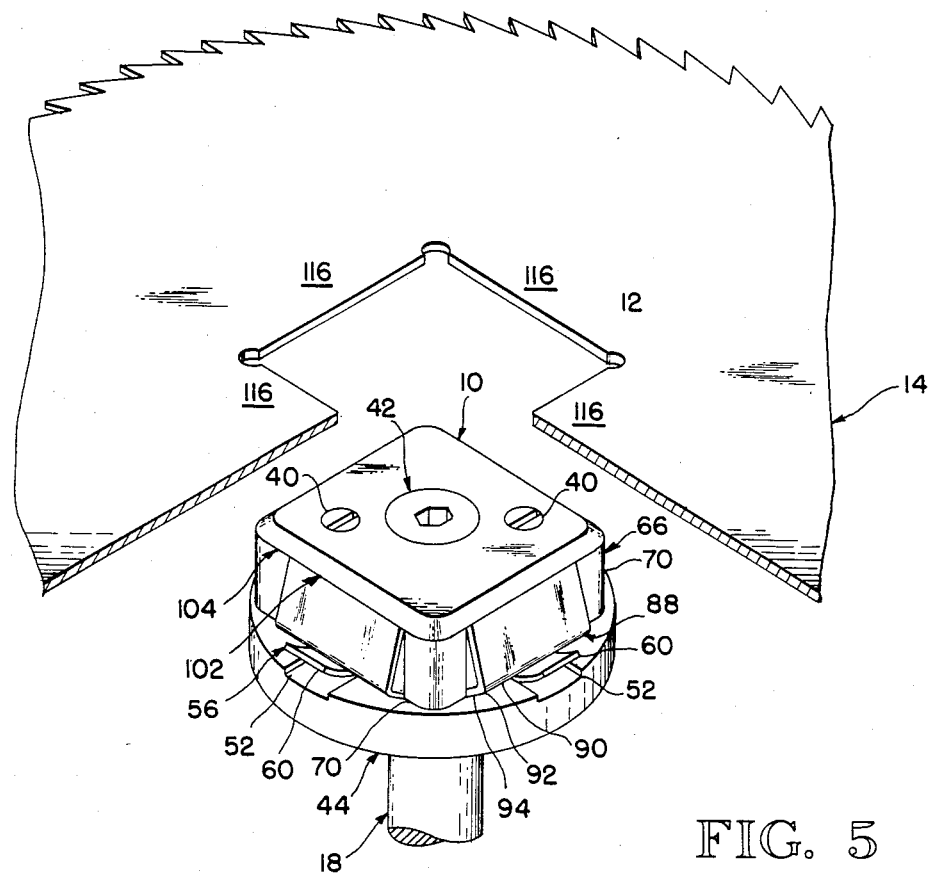
FIG. 5 is a perspective view of a portion of a circular saw blade, having a diamond arbor opening or hole, ready to be lowered down over the assembly of this quick change mechanism, which is installed on the arbor shaft or drive shaft of a power saw.

The Quick Placement of a Circular Saw Blade, Having a Diamond Arbor Hole, on the Quick Change Assembly, Which in Turn is Secured to the Arbor Shaft of the Power Saw As shown in FIG. 5, a circular saw blade 14, having a diamond arbor hole 12 is positioned to be axially lowered over the quick change mechanism 10, which in turn has been secured to the arbor shaft 18 by using the installation bolt 42. Then, as illustrated in FIG. 6, the circular saw blade 14 has been pushed axially to contact the upturned spring lips 60 of the legs 58 of the ejector spring 56. To arrive at this intermediate position, the four depending lock spring leafs 90, of lock spring 88, had to be radially compressed inwardly, by the circular saw blade 14, into the receiving spaces 80, in the outside diamond shape surface 68 of the body block 66.

The continuation and ending of the locking placement of the circular saw blade 14 is illustrated in FIG. 7. This circular saw blade 14 has been further axially moved to downwardly depress the spring lips 60 of the legs 58 of the ejector spring 56. As this axial position is reached, the four depending lock spring leafs 90 are cleared, and they quickly radially move outwardly over the circular saw blade 14. This blade 14 is then securely held about the body block 66 and between the lock spring 88 and the base 44, as the portions 116 of the circular saw blade 14, which are adjacent the diamond arbor hole 12, are gripped above by the leaf ridges 92 and leaf lips 94 of the lock spring 88, and gripped below by the spring lips 60 of the legs 58 of the ejector spring 56, which has been previously fitted into the ejector spring grooves 50 of the cylindrical base 44.

During cutting operations, the circular saw blade 14 remains securely in place. Then when the time arrives to remove the blade 14, a person uses his or her thumbs and forefingers to move the four depending lock spring leafs radially inwardly to clear the portions 116 of the blade 14. When this clearance is completed, the spring lips 60 of the legs 58 of the ejector spring 56 become effective, and the circular saw blade 14 is ejected clear of any restraints, for its continued removal from the power saw 16.

The next circular saw blade 14 is quickly installed, as shown in FIGS. 5, 6, and 7, and then safely used. Subsequently it too is removed upon moving radially inwardly the depending lock spring leafs. Both of these on and off procedures are undertaken without using any hand tools. Because of this overall very quick and easy method of installing and removing circular saw blades 14 or other discs, with respect to power saws, the users of these power saws will change blades or discs much more often, to get better cutting speeds or to obtain different results from different types of saw blades or discs.

I claim:

1. A quick change mechanism to change rotatable work contacting members which have diamond arbor center holes, such as circular saw blades, grinders, buffers, brushes, with respect to the drive shafts of power tools, comprising the axially arranged assembly of:
   (a) a base which is adapted to fit over a saw drive shaft and positioned adjacent to a saw body of a power tool and which is formed with a cross recess to position an ejector spring;
   (b) an ejector spring having four spaced legs terminating in respective upturned lips, which fits into the cross recess of the base and around a saw drive shaft;

(c) a diamond shaped body block which is adapted to fit over a drive shaft of a power tool and be positioned adjacent the ejector spring and having at its corners respective saw blade positioning lugs to fit corners of a diamond shaped arbor center hole of a circular saw blade;

(d) a lock spring which is adapted to fit over a saw drive shaft of a power tool and in contact with the ejector spring legs and lips, and arranged as a top with four side depending lock spring leafs, each lock spring leaf having a leaf ridge and a leaf lip;

(e) a retaining cap which is adapted to fit the top of a saw drive shaft of a power tool and be positioned adjacent the top of the lock spring, and present a surrounding top edge camming surface and have a central hole adapted to receive an installation bolt; and (f) two assembly bolts arranged respectively through two spaced aligned holes in each retaining cap, lock spring, body block, and threaded into aligned holes of the base, complete the assembly of this embodiment of the quick change mechanism.

2. A quick change mechanism, as claimed in claim 1, having in addition an installation bolt passed through the central hole of the retaining cap and adapted to be threaded into an internally threaded hole of a saw drive shaft of a power tool, to hold the quick change mechanism in place about an end of a saw drive shaft of a power tool.

3. A quick change mechanism to change rotatable work contacting members having diamond arbor center holes, such as circular saw blades, grinders, buffers, brushes, with respect to the drive shafts of power tools, comprising the axially arranged assembly of:

(a) a base which is adapted to fit over a saw drive shaft of a power tool to contact a saw body and to receive an ejector spring;

(b) an ejector spring which is adapted to fit over a saw drive shaft of a power tool and be received by the base;

(c) a body block which is adapted to fit over a saw drive shaft of a power tool and to receive the diamond arbor of a circular saw blade;

(d) a lock spring which is adapted to fit over a saw drive shaft of a power saw and be positioned down against and over the body block in contact with the ejector spring and also be radially retracted upon said axial movement of a circular saw blade to thereafter freely expand, upon the passing circular saw blade, thereby gripping the circular saw blade;

(e) a retaining cap which is adapted to fit an end of a saw drive shaft of a power tool, adjacent the lock spring, having a surrounding edge camming surface to guide a circular saw blade into position, and having a central hole to receive an installation bolt, which holds the quick change mechanism on a saw drive shaft of a power tool; and (f) a fastening means holding together the retaining cap, lock spring, body block, ejector spring, and base, as an axial assembly of the quick change mechanism.

4. A quick change mechanism, as claimed in claim 3, having in addition an installation bolt passed through the central hole of the retaining cap and adapted for threading into an internally threaded hole of a saw drive shaft of a power tool to hold the quick change mechanism in place about an end of a saw drive shaft of a power tool.

5. A quick change mechanism to change rotatable work contacting members which have diamond arbor center holes, such as circular saw blades, grinders, buffers, brushes, with respect to the drive shafts or arbor shafts of power tools, comprising the axially arranged assembly of:

(a) a cylindrical base which is adapted to be fitted over a saw drive shaft of a power tool and be positioned adjacent to a saw body portion of a power tool, and having a planar bottom, planar top, in turn having a cross recess positioning an ejector spring, a central hole receiving a saw drive shaft, of a power tool and two radially spaced threaded holes receiving unit assembly bolts;

(b) an ejector spring having a central portion, in turn having a central hole to receive a saw drive shaft of a power tool, four spaced legs, having in turn respective upturned lips at their ends, which fit into the cross recess of the cylindrical base and around a saw drive shaft of a power tool;

(c) a diamond shaped body block having a central hole to receive a saw drive shaft of a power tool and be positioned adjacent the ejector spring, and having at its corners integral respective saw blade positioning and protruding lugs which fit the corners of a diamond shaped arbor of a circular saw blade, and also having two radially spaced holes to receive unit assembly bolts, and having receiving spaces, top and bottom and alongside, created by the positioning and protruding lugs which at their locales increase the overall height and width of this diamond shaped body block;

(d) a lock spring having a planar top, in turn having a central hole to receive a saw drive shaft of a power tool, and two radially spaced holes to receive unit assembly bolts, and having four side outwardly biased depending lock spring leafs, each of these leafs having a depending leaf ridge and a depending leaf lip;

(e) a planar diamond shaped retaining cap adapted to fit the top of a saw drive shaft of a power tool and be positioned adjacent the top of the lock spring, having a countersunk central hole to receive an installation bolt, and two radially spaced countersunk holes to receive unit assembly bolts, and having a surrounding top edge camming surface to guide portions of a saw blade about a diamond hole thereof into axial contact and securement with this quick change mechanism; and (f) two unit assembly bolts passed respectively through the respective two radially spaced holes in the retaining cap, the lock spring, the body block, and threaded into the two radially spaced threaded holes in the cylindrical base, completing the assembly of this quick change mechanism.

6. A quick change mechanism, as claimed in claim 5, having in addition an installation bolt passed through the central hole of the retaining cap and adapted to be threaded into an internally threaded hole of a saw drive shaft of a power tool to hold the quick change mechanism in place about an end of a saw drive shaft of a power tool.

* * * * *